VARIATION OF HIGH SPEED REDUNDANCY CHECK GENERATOR

Filed July 28, 1958 2 Sheets-Sheet 1

VARIATION OF HIGH SPEED REDUNDANCY CHECK GENERATOR

Filed July 28, 1958 2 Sheets-Sheet 2

INVENTORS
KURT MERL
MORTON SETRIN
BY Victor D. Borst
ATTORNEY 3,025,508

VARIATION OF HIGH SPEED REDUNDANCY CHECK GENERATOR

Kurt Merl, New York, and Morton Setrin, Rome, N.Y.; said Merl assignor to Sperry Rand Corporation, Ford Instrument Company Division, Wilmington, Del., a corporation of Delaware Filed July 28, 1958, Ser. No. 752,157
4 Claims. (Cl. 340—345)

This invention relates to digital data processing systems, and more particularly to circuits for determining the odd or even parity of groups of digit pulses, and producing a redundancy signal to indicate the parity of the group, as for example for the purpose of detecting the erroneous omission or addition of pulses in coded groups of pulses incidental to data processing operations.

Some of the objects of the invention are to provide a high speed system for checking the odd or even parity of a group of pulses or a group of binary digits which the pulses represent; to produce at high speed a redundancy signal to indicate the parity of a group of pulses or digits; and to provide a reliable high speed parity checker, small in size, simple in construction, simple in operation, requiring only a small number of parts, and conveniently adapted for use as centralized equipment for checking the parity of pulses in any one of a plurality of channels.

The invention utilizes circuits for dividing a series of coded simultaneous signals representing binary digits into more convenient smaller groups, each group having a predetermined number of digit positions, preferably three. A separate digit signal circuit is provided to correspond respectively to each of the two binary values for each digit position in the group. Means are provided to produce a separate digit signal to represent each digit in every possible group of digits to be processed. The digit signal producing means has a separate output connection for transmitting each resulting digit signal to the corresponding digit signal circuit.

A separate "and" gate is provided for each digit signal permutation obtainable within a group which has the parity to be indicated. Each "and" gate has a separate input circuit for each of the digit signals represented by the permutation of that gate, and each input circuit is connected to the digit signal circuit corresponding to the same digit position and digit value. Each "and" gate is operable only by the permutation of digit signals simultaneously applied to its input circuits that correspond to the permutation of that gate. An output circuit for the "and" gate transmits a signal in response to the opening of the gate.

An "or" gate, having a single output circuit, has as many separate input circuits as the number of "and" gates, each input circuit being connected to a different one of the "and" gate output circuits for receiving the output signal from an opened "and" gate and transmitting the signal to the output circuit of the "or" gate to provide the desired redundancy signal indication.

The digit signal producing means includes an encoder for producing a separate digit signal to represent in the signal group each digit to be represented by the binary symbol value 1, while producing the absence of a digit signal to represent the other binary symbol value 0. A selector signal, which initiates each digit signal in the encoder, also produces a channel signal of the same amplitude and phase as the digit signals. A separate transducer, one to correspond to each different digit position in the group, has an input circuit with an energizer terminal for receiving the channel signal and a second terminal for receiving a digit signal corresponding to that transducer digit position and to the binary symbol value 1. The transducer input circuit is responsive to the channel signal applied to the energizer terminal when a digit signal is not present at the second terminal and is nonresponsive to the channel signal when a digit signal is present at the second terminal. Each transducer has an output circuit which transmits to the digit signal circuit corresponding to that transducer and the binary value 0, a digit signal of the same phase as the digit signals in the other digit signal circuits. Each transducer is thus adapted to make available for reliable parity checking purposes a digit signal to represent any binary digit of value 0, previously represented by the absence of a pulse in the code set up by the encoder.

These and other objects, features, and advantages of the invention will be more apparent from the following detailed description and the accompanying drawings, in which.

Figure 1:
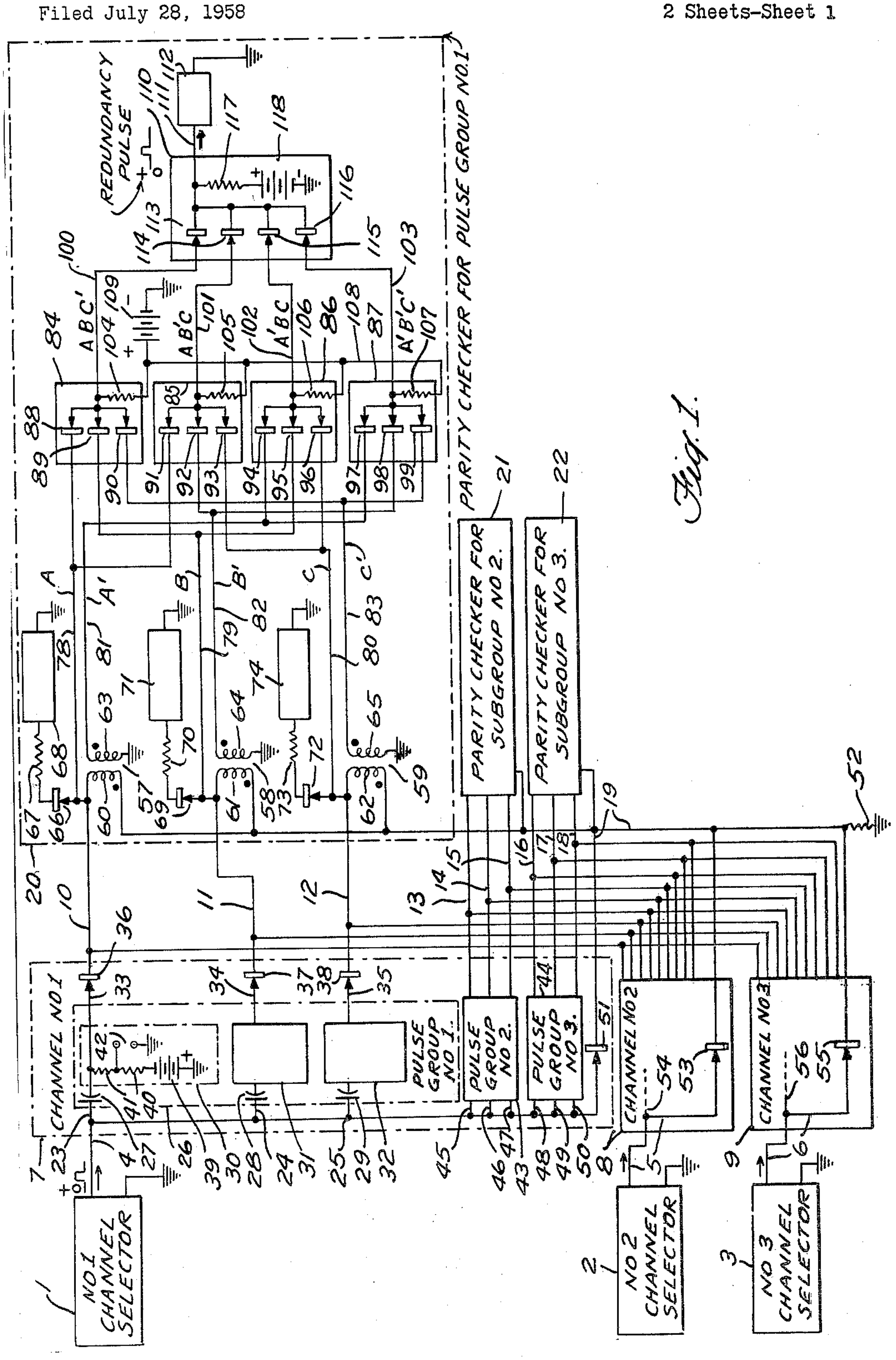
FIG. 1 is a schematic circuit diagram of an even parity checking system.

Referring to FIG. 1, each of the positive pulse signal sources 1, 2 and 3 serves as a channel selector, and has an output circuit consisting of the conductor 4, 5 or 6, respectively, and ground, for transmitting a selector pulse for activating one of the pulse encoders 7, 8 or 9, corresponding to channel No. 1, 2 or 3, respectively. Each encoder 7, 8 or 9 is of the same construction and has a series of nine separate digit signal output circuits, divided for convenience of operation into groups of three, one side of each output circuit being grounded, the other side consisting of the conductors 10, 11, 12, respectively, for the three digit pulses in group No. 1, conductors 13, 14, 15, respectively, for the three digit pulses in group No. 2, and conductors 16, 17, 18, respectively, for the three digit pulses in group No. 3. Each encoder 7, 8, 9, also has an additional channel pulse output circuit consisting of the conductor 19 and ground.

Digit pulse conductors 10, 11, 12 and channel signal conductor 19 connect with the parity checker 20 for pulse group No. 1; digit signal conductors 13, 14, 15 and channel signal conductor 19 connect with the parity checker 21 for pulse group No. 2; and digit signal conductors 16, 17, 18 and channel signal conductor 19 connect with the parity checker 22 for pulse group No. 3.

In the pulse encoder 7, the conductor 4 has three branches 23, 24, 25, leading to the group encoder 26 for the pulse group No. 1. A separate capacitor 27, 28, 29, respectively, couples each branch conductor 23, 24, 25 respectively, with a separate keyer 30, 31, 32, respectively, each keyer in turn having an output conductor 33, 34, 35, respectively, in series with the gate diode 36, 37, 38, respectively, preferably of the semiconductor type in series with the encoder output conductors 10, 11, 12, respectively.

The keyer 30 includes the D.C. source 39 which applies an inverse polarizing voltage to the diode 36 by way of resistor 40 in series with resistor 41 and conductor 33, when the junction of the resistors 40, 41 is not grounded by closure of key 42. This inverse voltage closes the gate through diode 36 to block the transmission of a positive pulse from source 1 over conductors 4, 23, and 33. When the inverse voltage is removed from diode 36 by closure of key 42, the diode gate 36 is opened and a pulse from the source 1 is transmitted to the output conductor 10 and the parity checker 20. The keyers 31 and 32 are constructed similarly to the keyer 30 and operate in a similar manner. It will be seen that the keyers 30, 31, 32, in connection with the associated diodes 36, 37, 38, in the group encoder 26 for pulse group No. 1, makes it possible to represent any desired permutation in the group of three binary digits by a pulse representing one binary value for a given digit position and the absence of a pulse representing the other binary value.

The keyer 30 obviously may be of any other suitable form differing from that shown, such as a well known flip-flop circuit, switch, or the like (not shown) to block or pass the selector pulse in accordance with digit code set up by the keyer.

The group encoder 43 for pulse group No. 2 and the group encoder 44 for pulse group No. 3, are each constructed similarly to and operate similarly to the group encoder 26 for pulse group No. 1. The group encoder 43 for pulse group No. 2, has the three input conductors 45, 46, 47, and the output conductors 13, 14, 15; the group encoder 44 for pulse group No. 3, having the three input conductors 48, 49, 50, and the output conductors 16, 17, 18. Input conductors 45 to 50, branch from the selector pulse conductor 4 which also connects with the anode of diode 51, the cathode of which connects with the channel pulse conductor 19 which is common to all of the channels Nos. 1 to 3. The resistor 52 connects from the channel pulse conductor 19 to ground.

The circuits of the pulse encoders 8 and 9 are similar to and operate similarly to the pulse encoder 7, as described above, the selector pulse conductor 5 being connected with the anode of diode 53, the cathode of which connects with the conductor 19, thus corresponding with the diode 51 in encoder 7. The lead 54 schematically represents the branch input connections for the three group encoders (not shown) in encoder 8, which correspond with the group encoders 26, 43, 44, respectively, in encoder 7. The diode 55 in encoder 9 corresponds with diode 53 in encoder 8, and the lead 56 in encoder 9 corresponds with lead 54 in encoder 8.

It will be seen that each of the ten output conductors extending from the right side of encoder 8, and each of the ten extending from the right side of encoder 9, is connected in parallel with the similarly positioned conductor in the similarly shown series of ten output conductors 10 to 19, extending from the right side of encoder 7. These output conductors provide nine digit pulse input connections 10 to 18 and one channel pulse input connection 19 for the single central bank of parity checkers 20, 21, 22, so that the parity of any group of three digits in a series of nine digits, coded in any one of three channels, may be subjected to a parity check.

Since each of the encoders 7, 8, and 9 is adapted to encode pulses to represent digits in a series of nine binary digit positions, and since each digit position has a symbolic binary value of 1 or 0, the binary digit 1 may represent the digit values from $2^8$ to $2^0$. The 1's in the pulse group No. 1 may thus represent the digits $2^8$, $2^7$, and $2^6$, the pulse representing the digit $2^8$ being transmitted to the conductor 10, the $2^7$ pulse being transmitted to the conductor 11, and the $2^6$ pulse being transmited to the conductor 12. The pulse group No. 2 includes the digits $2^5$, $2^4$, and $2^3$, the pulses representing these digits being transmitted respectively to the conductors 13, 14 and 15. The pulse group No. 3 includes the digits $2^2$, $2^1$, and $2^0$, the pulses representing these digits being transmitted, respectively, to conductors 16, 17 and 18, the symbolic value of 0 being represented by the absence of a pulse.

The pulse transformers 57, 58, 59, having the primaries 60, 61, 62, respectively, and the secondaries 63, 64, 65, respectively, serve as transducers to produce digit pulses corresponding to the symbolic binary value 0, transformer 57 corresponding to the $2^8$ digit position in the group of digits $2^8$, $2^7$, $2^6$, the transformer 58 corresponding to the $2^7$ digit position, and the transformer 59 corresponding to the $2^6$ digit position.

The primaries 60, 61, 62 of the transformers 57, 58, 59 constitute input circuits for the channel pulse, the lower terminal of each primary serving as an energizer terminal to which a positive channel pulse is applied by conductor 19 whenever a channel selector pulse is transmitted to one of the encoders 7, 8, or 9. The upper terminal of each primary serves as a comparison terminal to which a digit pulse of the same amplitude and phase as the channel pulse may be applied to reduce the voltage on the primary to zero and thus prevent its energization. In the absence of such a digit pulse, a channel pulse applied to the lower terminal of primary 60 is passed upwardly through the primary 60 to ground over a path through the forwardly poled diode 66 in series with the resistor 67 and the low impedance input terminal of circuit 68, or other suitable low resistance path to ground such as a delay line. A similar ground path, extending from the upper terminal of primary 61, includes the forwardly poled diode 69 in series with the resistor 70 and the low impedance input of circuit 71, or other suitable resistance path to ground. A similar ground path, extending from the upper terminal of primray 62, includes the forwardly poled diode 72 in series with the resistor 73 and the low impedance input circuit 74, or other suitable resistance path to ground, such as a delay line.

The dot near the lower terminal of each transformer primary 60, 61, 62, indicates that when the positive channel pulse applied to that terminal passes through the primary it produces a positive pulse at the upper terminal of the secondary 63, 64, 65, respectively, as shown by the dot adjacent thereto. Each secondary 63, 64, 65, thus forms an output circuit for the pulse produced by a channel pulse passing through one of the primaries 60, 61, 62, respectively.

Each conductor 10, 11, 12, is connected, respectively, to one of the digit pulse conductors 78, 79, 80. The lower terminal of each secondary 63, 64, 65, is grounded, and each upper terminal is connected, respectively, to one of the digit pulse conductors 81, 82, 83.

For convenience, the three digit pulses in group No. 1, encoded by the keyers 30, 31, 32, and representing the digits $2^8$, $2^7$, $2^6$, respectively, will be referred to by the unprimed letters A, B, C, respectively, and the three digit pulses supplied by the secondaries 63, 64, 65 of transformers 57, 58, 59, respectively, will be referred to by A′, B′, C′, respectively, these letters being applied, respectively to the conductors 78, 79, 80, 81, 82, 83.

The binary digit positions corresponding with the presence or absence of pulses in group No. 1, contain three digits which may produce four permutations for odd parity, namely, ABC′, AB′C, A′BC, and A′B′C′, and four permutations for even parity, namely, A′B′C, A′BC′, AB′C′, and ABC.

The parity checker 20 is arranged to produce a redundancy pulse to indicate when any permutation of pulses applied thereto is of odd parity. The four "and" gates 84, 85, 86, 87, are of the same construction, gate 84 including the diodes 88, 89, 90; gate 85 the diodes 91, 92, 93; gate 86 the diodes 94, 95, 96; and gate 87 the diodes 97, 98, 99. These diodes are preferably of the semiconductor type, but may be of other suitable electronic type. The anodes of diodes 88, 89, 90 connect with the "and" gate 84 output conductor 100; the anodes of diodes 91, 92, 93 connect with the "and" gate 85 output conductor 101; the anodes of diodes 94, 95, 96 connect with the "and" gate 86 output conductor 102; and the anodes of diodes 97, 98, 99 connect with the "and" gate 87 output conductor 103.

In the "and" gate 84 the diode 88 cathode connects with the digit signal conductor 78 representing digit A; the diode 89 cathode connects with conductor 79 representing digit B; and the diode 90 cathode connects with conductor 83 representing digit C′; the cathode connections providing input circuits for the pulse permutation ABC′, as indicated by these letters applied to the output conductor 100. In the "and" gate 85, the diode 91 cathode connects with conductor 78 for digit A, the diode 92 cathode connects with conductor 82 for digit B′, and the diode 93 cathode connects with the conductor 80 for digit C; the cathode connections thus providing input circuits for the pulse permutation AB′C, as indicated by these letters applied to the output conductor 101. In the "and" gate 86, the diode 94 cathode connects with conductor 81 for digit A′, the diode 95 cathode connects with conductor 79 for digit B, and the diode 96 cathode connects with the conductor 80 for the digit C; the cathode connections thus providing input circuits for the pulse permutation A′BC, as indicated by these letters applied to the output conductor 102. In the "and" gate 87, the diode 97 cathode connects with the conductor 81 for the digit A′, the diode 98 cathode connects with the conductor 82 for the digit B′, and the diode 99 cathode connects with the conductor 83 for the digit C′; the cathode connections thus providing input circuits for the pulse permutation A′B′C′, as indicated by these letters applied to the output conductor 103.

Each "and" gate 84, 85, 86, 87, has one of the resistors 104, 105, 106, 107, respectively, each resistor being connected at its upper end with one of the output conductors 100, 101, 102, 103, respectively, the lower ends of the resistors being connected by the conductor 108 to the positive terminal of the D.C. source 109, the negative terminal of which is grounded.

The output circuit conductors 100, 101, 102, 103, for the "and" gates 84, 85, 86, 87, respectively, constitute the input circuit conductors for the "or" gate 110, having the output circuit conductor 111 for the redundancy pulse produced by the parity checker 20, the conductor 111 being connected to one terminal of the redundancy pulse receiving device 112, the other terminal of which is grounded. The device 112 may be a delay line input tap circuit (not shown), or other device for indicating, utilizing, or sharing the pulse.

The "or" gate 110 includes the four diodes 113, 114, 115, 116, preferably of the semiconductor type, having their cathodes connected to the output circuit conductor 111, and their anodes connected, respectively, to the input circuit conductors 100, 101, 102, 103, respectively, of the "or" gate 110. The resistor 117, connected at its upper end to conductor 111, is connected at its lower end to the positive terminal of the D.C. source 118, the lower end of which is grounded. The D.C. source 118 applies an inverse voltage to the "or" gate diodes 113, 114, 115, 116, through the resistor 117, when no signal is being applied to the input of the gate, and sets a threshold input voltage which must be exceeded before an output signal can be produced. The resistor 117 is made sufficiently high to avoid undesirable shunting of the output signal.

When there are no pulses applied to the digit pulse conductors 78 to 83, the D.C. source 109 supplies current to each of the "and" gates 84, 85, 86, 87, wherein one of the resistors 104, 105, 106, 107, within that gate passes the current in parallel through the three diodes of that gate, for example, diodes 88, 89, 90 in gate 84. The cathode of each diode in any "and" gate has a current return path through that one of the digit pulse conductors 78 to 83, connected to that cathode, the return path for conducors 78, 79, and 80, being traced to ground through the three elements 66, 67, 68 for conductor 78, elements 69, 70, 71 for conductor 79, elements 72, 73, 74 for conductor 80, the secondary 63 for conductor 81, the secondary 64 for conductor 82, and the secondary 65 for conductor 83.

The resistance of each resistor 104, 105, 106, 107 is high relative to the forward resistance of each diode in the "and" gates 84, 85, 86, 87, when no pulses are being applied to the diodes, but is low compared to the inverse resistance of each diode. The current is adjusted in a manner well known in the art for "and" gate operation. When the current in diode 88, or diodes 88 and 89 is modulated downward or blocked by inverse voltage signal pulses applied to these diodes, while there is no signal pulse applied to diode 90, the diode 90 continues to carry enough current to prevent the potential of the output conductor 100 from rising sufficiently to produce a corresponding working signal therein, but when the current in all three of the diodes is simultaneously modulated downward or blocked by three inverse voltage signal pulses, the potential of the output conductors 100 rises in response thereto, so that the gate is in effect opened to produce an output pulse corresponding with the simultaneously applied permutation group of input pulses. The other "and" gates 85, 86, and 87, operate in a manner similar to that of "and" gate 84.

A typical operation of the parity checking system will now be described. We may assume that channel No. 1 is to be selected and that in the encoder 7 for encoding a series of nine digits, the keys 42 in each of the group encoders 26, 43 and 44 is in its proper position to produce a coded series of pulses. If the digits to be represented by the pulse group No. 1 are A′B′C′, the key 42 is open in each of the keyers 30, 31, 32. A positive pulse is then applied to the No. 1 channel selector, as indicated by the pulse diagram adjacent conductor 4. Since the open keys 42, cause the D.C. source 39 in these three keyers to apply an inverse voltage to the conductors 33, 34, 35, thereby blocking the passage of the pulse through the diodes 36, 37, 38, no pulse can reach the output conductors 10, 11, 12, and the resulting absence of a pulse on these conductors represents the digits A′B′C′.

The channel selector pulse on conductor 4 however is free to pass through diode 51 to channel pulse conductor 19 and to the energizer or lower terminal of each transformer primary 60, 61, 62. Since the absence of pulses on conductors 10, 11, 12 leaves the upper terminals of the primaries 60, 61, 62 free from a comparison potential, the channel pulse voltage provided on these primaries, produces a pulse in each of the secondaries 63, 64, 65, and on each of the digit pulse conductors 81, 82, 83, and an inverse voltage pulse on each of the diodes in "and" gate 87, thereby modulating downwardly the current in all three diodes, thus opening the gate 87 and transmitting an output pulse over conductor 103 and through diode 116 of the "or" gate 110, to indicate the even parity by producing a redundancy pulse in the output conductor 111 and the receiving device 112, as represented schematically by the pulse diagram adjacent conductor 111.

If the digits to be represented in pulse group No. 1 had been ABC′, a pulse would be produced on conductors 10 and 11 corresponding to A and B and would be applied to the upper terminals of primaries 60, 61, thereby preventing the production of a pulse on conductors 81 and 82, but producing a pulse on conductors 78, 79, while the channel pulse on conductor 19 produces a pulse, through transformer 59 on conductor 83, thereby producing the permutation ABC′, to open gate 84 and produce in the output conductor 111, the redundancy pulse indication of even parity. Any pulse group of odd parity would fail to open any of the gates 84, 85, 86, 87, as they respond only to even parity permutations of pulses. The operation of the group encoder 43 with its parity checker 21, and of group encoder 44 with its parity checker 22, are similar to the above described operation of group encoder 26 with its parity checker 20.

Figure 2:
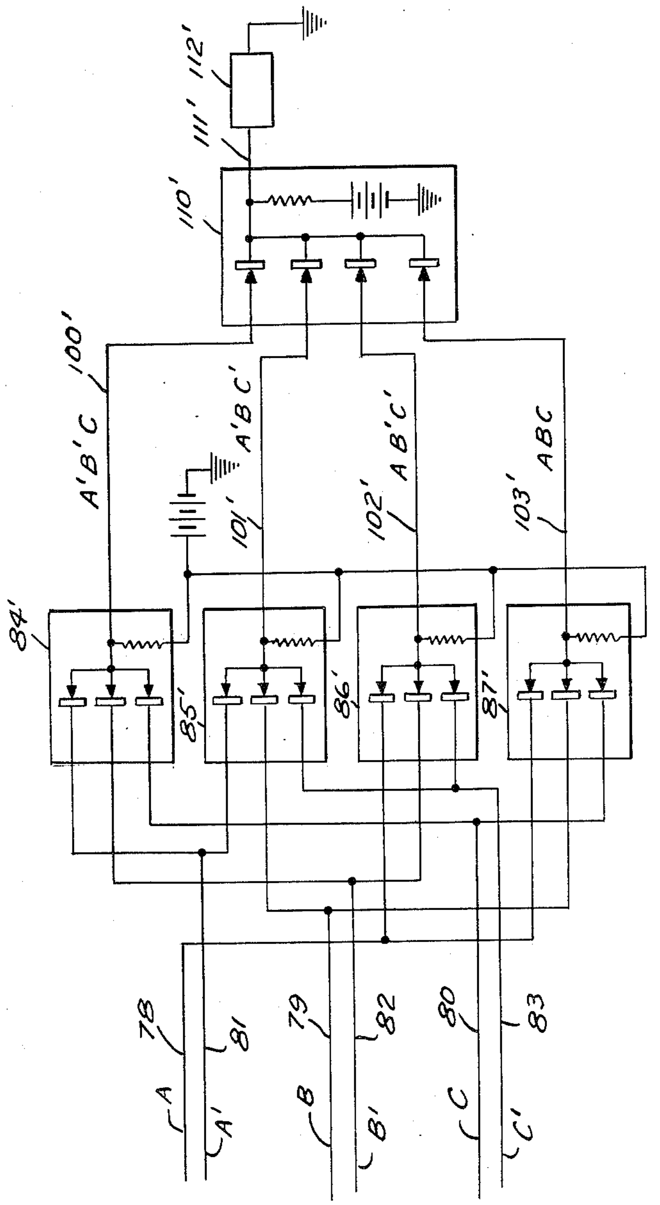
FIG. 2 is a schematic circuit diagram showing a modification of a part of FIG. 1, to convert the even parity checker of FIG. 1 into an odd parity checker.

In the even parity checking system of FIG. 2, the primed reference characters designate circuit components having the same construction as those designated by the same numerals, unprimed in the odd parity checking system of FIG. 1. It will be noted that the "and" gate connections extending from digit pulse conductors 78 to 83, inclusive, in FIG. 2, differ from the corresponding FIG. 1 connections, in that in FIG. 2, each of the conductors 78, 79, 80, connects with those diode cathodes in the "and" gates 84', 85', 86', 87', that correspond with the diode cathodes connected with the conductors 81, 82, 83, respectively, in FIG. 1. Likewise, the "and" gate diode cathodes connected with the conductors 81, 82, 83, in FIG. 2, correspond with those connected with the conductors 78, 79, 80, respectively, in FIG. 1. As a result of these differences in the "and" gate input circuit connections, the permutations of digit pulses adapted to pass the "and" gates 84', 85', 86', 87', are A'B'C, A'BC', AB'C', and ABC, as indicated by the lettering applied to the conductors 100', 101', 102', 103', these permutations being for even parity. A redundancy pulse produced in the output conductor 111' and the pulse receiving device 112', thus indicates that the pulses applied to the conductors 78 to 83, are for even parity.

Since the pulses employed for high speed operation of the above described circuits are necessarily of short duration, in some cases of the order of a microsecond, certain factors, for example, the capacitance between the pulse conductors and ground, and other details may require special attention.

If the assumption is made that the shunting capacitance between the output conductor 100 of the "and" gate 84 is approximately 40 micro-microfarads, then with a current through resistor 104 of 1.5 milliamperes, a voltage of the order of 9 volts should be realizable from the gate with a rise time of approximately 0.25 microsecond.

Another item to be given attention is the voltage to be developed across the primary of any one of the transformers 57, 58, 59. When a digit pulse is not present at the upper terminal of a primary, the entire operating voltage available from the channel pulse should be developed across the transformer primary. This is absolutely necessary, if the signal to noise ratio for the parity checking system is to be kept to a minimum. In FIG. 1 it can be seen that at least one input conductor to each of the gates 84, 85, and 86 connects with an upper terminal of a primary 60, 61 or 62, and that the potential of this terminal above ground is raised by the current flowing to ground through one of the three paths 66, 67, 68, or 69, 70, 71, or 72, 73, 74, from an "and" gate diode supplied from the D.C. source 109. If, under the conditions of the absence of a digit pulse at an upper terminal, a voltage of as much as 3 volts or greater is developed by this diode current, the voltage available across the primary in response to the channel pulse applied to the energizer or lower terminal of the primary, is objectionably reduced by the 3 volts applied to the upper terminal.

In order to avoid this condition, the impedance presented by the transformer must be quite high, at least ten to fifteen times higher than the combined impedance of the path to ground from an upper terminal, such as the path 66, 67, 68. Since the loading on the transformer is almost negligible, this impedance must be realized with the magnetizing inductance of the transformer. A large magnetizing inductance is realizable with a large number of turns, and the accompanying reduction in high frequency response. Nevertheless, in order to implement this scheme with a minimum number of components, it is necessary to sacrifice frequency response and incur possible time delay otherwise avoidable.

Another item to be noted is the effect produced on the A'B'C' gate 87 when the A and B pulses are absent from the parity checker, and the C pulse is present. For this condition, pulses will appear on secondaries 63 and 64, but there will be none on the secondary 65. The pulses from 63 and 64 will apply voltages to the diodes 97 and 98 in a direction reducing the current through them, and the current they were conducting before the pulses were applied is assumed through diode 99 as a pulse current. This pulse current is reflected into the transformer primary 62 and conductor 19 where it opposes the current of the channel pulse through diode 51. Since the currents flowing through diode 51, or the diodes 53, or 55 when they transmit the channel pulse to conductor 19, will be relatively small (as the series paths of the transformers are of high impedance), it is possible for these reverse pulse currents to overcome the initial forward pulse current through the diode 51 (or 53, or 55), and block the current through it. This can become especially troublesome, since there are three pulse groups simultaneously in operation and the three parity checkers 20, 21, 22 have nine transformer combinations present.

To avoid this effect, the resistor 52 is chosen to draw a sufficiently large amount of forward current through the diodes 51, 53, 55, to prevent the sum of all the possible reverse currents from ever exceeding the forward current.

Another problem involving reverse currents requiring attention, arises when a pulse is applied to only one or two diodes of an "and" gate. For example, in the case of the "and" gate 86 for A'BC, if the A' and B pulses are present and the C pulse is not present, a reverse pulse current of 1.5 milliamperes may be flowing through the conductor 80. If the elements 72, 73, 74 have a resistance of over 2,000 ohms, there may be a voltage drop through these elements of approximately 3.5 volts. This voltage will reflect itself as an undesirable noise output of the same order of magnitude from the gate 86. However, with a realizable signal of approximately 8 volts, the 3 volts of noise can be rejected by the reverse bias applied at the "or" gate 110 output terminal by the D.C. source 118.

It is considered that a signal to noise ratio of 2 provides acceptable operation, and with this ratio, redundancy pulses of approximately 3 volts should be obtainable under adverse conditions. Since a 2 volt redundancy signal provides reliable operating results, the 3 volt signal is considered adequate.

When elements 68, 71, 74 consist of delay line input tap circuits, it is possible for the delay line to give rise to positive pulses fed from ground to the upper terminal of one of the primaries 60, 61, 62, with the result that when the diodes 66, 69, 72, are not provided, a negative pulse appears on one of the corresponding conductors 81, 82, 83. While no trouble comes directly from this negative pulse, there is a positive pulse overshoot produced on the corresponding conductor 81, 82, 83, after the negative pulse passes, and this positive overshoot can cause difficulties under some conditions. By providing the diodes 66, 69, 72 to oppose the positive pulse from element 68, or 71, or 74, respectively, this difficulty is remedied. When such a positive pulse is not produced, or is not troublesome, the diodes 66, 69, 72, may be omitted.

It will be apparent that digits other than $2^8$ to $2^0$ might be chosen to be represented by the nine digit pulses, and that the pulse groups are not limited in principle to groups of three pulses.

Since only three digit signal connections, such as 10, 11, 12, and one channel signal connection is needed at the input of each parity checker, the checker may be connected as a centralized piece of equipment conveniently to check the parity of any desired number of channels and it will be apparent that the described parity checking system is not limited to three channels.

A single error in a series of nine digit pulses on conductors 10 to 18 may readily be detected by the single central bank of three checkers 20, 21, 22, and the location of the error narrowed down to the pulse group indicated by the redundancy pulse. As many as three simultaneous errors in one channel may be detected and located in one channel when they are in different pulse groups.

Since the number of components in the system of the present invention is relatively small and the connections thereto relatively simple, the size of the parity checking system as a whole may be made relatively small and compact as a result of the nature of the components. The construction is simplified by the fact that the "and" gates may be of identical structure.

It is to be understood that various modifications of the invention other than those described may be effected by persons skilled in the art without departing from the principles and scope of the invention as defined in the appended claims.

What is claimed is:

1. A parity generator comprising a pulse signal source, a pulse encoder havign a plurality of keyer components connected to receive pulses from the signal source and a parity checker, said parity checker including a plurality of transformers, each transformer having a primary winding and a secondary component, each primary winding of each transformer having one side connected, respectively, to one keyer component and the other side of the primary windings in all transformers being connected directly to said pulse signal source, said checker also including a plurality of "and" gates, each of said "and" gates having several input circuits, the connections to all save at least one of the "and" gates being such that two of the components of one type are connected, respectively, to two of the input circuits in each gate and one of the components of the other type are connected to a third input circuit in each gate and the connections to at least one of the "and" gates are such that three components of the same type are connected, respectively, to three input circuits, and an "or" gate connected to receive the output of said "and" gates.

2. A parity generator comprising a pulse signal source, a pulse encoder having a plurality of keyer components connected to receive pulses from the signal source and a parity checker, said parity checker including a plurality of transformers, each transformer having a primary winding and a secondary component, each primary winding of each transformer having one side connected, respectively, to one keyer component and the other side of the primary windings in all transformers being connected directly to said pulse signal source, circuit establishing, low impedance elements connected to the said one side of the primary winding so as to provide a low resistance circuit path for the pulses from said signal source which are passed directly to the primary winding, said checker also including a plurality of "and" gates, each of said "and" gates having several input circuits, the connections to all save at least one of the "and" gates being such that two of the components of one type are connected, respectively, to two of the input circuits in each gate and one of the components of the other type are connected to a third input circuit in each gate and the connections to at least one of the "and" gates are such that three components of the same type are connected, respectively, to three input circuits, and an "or" gate connected to receive the output of said "and" gates.

3. A parity generator having several signal sources, a pulse encoder connected to each signal source and having a plurality of keyer components, a parity checker connected to each of said pulse encoders, each parity checker including a plurality of transformers, each transformer having a primary winding and a secondary component, each primary winding of each transformer having one side connected, respectively, to one keyer component and the other side of the primary windings in all transformers being connected directly to said pulse signal source, circuit establishing, low impedance elements connected to the said one side of the primary winding so as to provide a low resistance circuit path for the pulses from said signal sources which are passed directly to the primary winding, each parity checker also including a plurality of "and" gates, each of said "and" gates having several input circuits, the connections to all save at least one of the "and" gates being such that two of the components of one type are connected, respectively, to two of the input circuits in each gate and one of the components of the other type are connected to a third input circuit in each gate and the connections to at least one of the "and" gates are such that three components of the same type are connected, respectively, to three input circuits, and an "or" gate connected to receive the output of said "and" gates.

4. A parity encoder comprising several pulse signal sources, a pulse encoder connected to each signal source and comprising a plurality of group encoders, each of said group encoders having a plurality of keyer components, a parity checker connected to one of the group encoders in each pulse encoder, each parity checker including a plurality of transformers, each transformer having a primary winding and a secondary component, each primary winding of each transformer having one side connected, respectively, to one keyer component and the other side of the primary windings in all transformers being connected directly to said pulse signal source, circuit establishing, low impedance elements connected to the said one side of the primary winding so as to provide a low resistance circuit path for the pulses from said signal sources which are passed directly to the primary winding, each checker also including a plurality of "and" gates, each of said "and" gates having several input circuits, the connections to all save at least one of the "and" gates being such that two of the components of one type are connected, respectively, to two of the input circuits in each gate and one of the components of the other type are connected to a third input circuit in each gate and the connections to at least one of the "and" gates are such that three components of the same type are connected, respectively, to three input circuits, and an "or" gate connected to receive the output of said "and" gates.

References Cited in the file of this patent

UNITED STATES PATENTS 2,674,727 Spielberg ---------------- Apr. 6, 1954
2,719,959 Hobbs ------------------ Oct. 4, 1955
2,848,607 Maron ------------------ Aug. 19, 1958
2,879,498 Kalin ------------------ Mar. 24, 1959